(12) United States Patent
Wang et al.

(10) Patent No.: US 11,506,901 B2
(45) Date of Patent: Nov. 22, 2022

(54) METHOD AND SYSTEM FOR SIMULTANEOUSLY TRACKING 6 DOF POSES OF MOVABLE OBJECT AND MOVABLE CAMERA

(71) Applicant: INDUSTRIAL TECHNOLOGY RESEARCH INSTITUTE, Hsinchu (TW)

(72) Inventors: Te-Mei Wang, Hsinchu (TW); Chung-Yang Hsieh, Hualien (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/369,669

(22) Filed: Jul. 7, 2021

(65) Prior Publication Data
US 2022/0011579 A1   Jan. 13, 2022

Related U.S. Application Data

(60) Provisional application No. 63/049,161, filed on Jul. 8, 2020.

(30) Foreign Application Priority Data

Apr. 21, 2021   (TW) .................. 110114401

(51) Int. Cl.
*G06T 7/70* (2017.01)
*G06F 3/0346* (2013.01)
(Continued)

(52) U.S. Cl.
CPC ....... *G02B 27/0172* (2013.01); *G06F 3/0346* (2013.01); *G06T 7/70* (2017.01);
(Continued)

(58) Field of Classification Search
CPC ........ G02B 27/0172; G02B 2027/0178; G02B 2027/0138; G02B 2027/018;
(Continued)

(56) References Cited

U.S. PATENT DOCUMENTS 10,311,833 B1 * 6/2019 Qiu ....................... G09G 3/003
10,521,026 B2   12/2019 Balan et al.
(Continued)

FOREIGN PATENT DOCUMENTS

CN    105988219 A    10/2016
CN    109725636 A     5/2019
(Continued)

OTHER PUBLICATIONS

Bhat et al., "Unveiling the Power of Deep Tracking", arXiv:1804.06833v1 [cs.CV], Apr. 18, 2018, pp. 1-16.
(Continued)

*Primary Examiner* — Mihir K Rayan
(74) *Attorney, Agent, or Firm* — Birch, Stewart, Kolasch & Birch, LLP

(57) ABSTRACT

A method and a system for simultaneously tracking several 6 DoF poses of a movable object and a movable camera are provided. The method the following steps: A series of images are captured by a movable camera, several environmental feature points are extracted from the images and are matched to compute several camera matrixes of the movable camera, and the 6 DoF poses of the movable camera are computed using the camera matrixes. At the same time, several feature points of the movable object are inferred from the images captured by the movable camera, the coordinates of the feature points of the movable object are corrected using the camera matrixes corresponding to the images as well as the predefined geometric and temporal constraints. Then, the 6 DoF poses of the movable object are
(Continued)

computed using the coordinates of the corrected feature points and their corresponding camera matrixes.

20 Claims, 13 Drawing Sheets

(51) Int. Cl.
  *G06T 19/00* (2011.01)
  *G06T 7/73* (2017.01)
  *G06F 3/01* (2006.01)
  *G02B 27/01* (2006.01)

(52) U.S. Cl.
  CPC .......... *G06T 19/006* (2013.01); *G02B 27/017* (2013.01); *G02B 2027/0138* (2013.01); *G02B 2027/0178* (2013.01); *G06F 3/011* (2013.01); *G06T 7/73* (2017.01); *G06T 2207/20081* (2013.01); *G06T 2207/20084* (2013.01)

(58) Field of Classification Search
  CPC ..... G02B 27/017; G06F 3/0346; G06F 3/011; G06T 7/70; G06T 2207/10016; G06T 2207/20081; G06T 2207/20084; G06T 2207/30244; G06T 7/579; G06T 7/73; G06T 19/006
  See application file for complete search history.

(56) References Cited

U.S. PATENT DOCUMENTS

| | | |
|---|---|---|
| 10,529,135 B2 | 1/2020 | Hesch et al. |
| 10,649,212 B2 | 5/2020 | Burns et al. |
| 2014/0248950 A1* | 9/2014 | Tosas Bautista ......... G06F 3/01 463/31 |
| 2017/0045736 A1* | 2/2017 | Fu ........................ G02B 27/017 |
| 2019/0235622 A1 | 8/2019 | Tu et al. |
| 2020/0089313 A1* | 3/2020 | Himane ................. G06F 3/016 |

FOREIGN PATENT DOCUMENTS

| | | |
|---|---|---|
| CN | 110161488 A | 8/2019 |
| CN | 111311632 A | 6/2020 |
| TW | 201842431 A | 12/2018 |
| TW | 201915943 A | 4/2019 |
| TW | 1664533 B | 7/2019 |

OTHER PUBLICATIONS

Iqbal et al., "PoseTrack: Joint Multi-Person Pose Estimation and Tracking", arXiv:1611.07727v3 [cs.CV], Apr. 7, 2017, pp. 2011-2020.

Sridhar et al., "Real-time Joint Tracking of a Hand Manipulating an Object from RGB-D Input", arXiv:1610.04889v1 [cs.CV], Oct. 16, 2016, pp. 1-17.

Tao et al., "Siamese Instance Search for Tracking", arXiv:1605.05863v1 [cs.CV], May 19, 2016, 10 Pages.

Wang et al., "Fast Online Object Tracking and Segmentation: A Unifying Approach", arXiv:1812.05050v2 [cs.CV], May 5, 2019, pp. 1328-1338.

Xiao et al., "Simple Baselines for Human Pose Estimation and Tracking", arXiv:1804.06208v2 [cs.CV], Aug. 21, 2018, 17 pages including cover page.

Taiwanese Office Action and Search Report for Taiwanese Application No. 110114401, dated Jan. 21, 2022.

\* cited by examiner

METHOD AND SYSTEM FOR SIMULTANEOUSLY TRACKING 6 DOF POSES OF MOVABLE OBJECT AND MOVABLE CAMERA

This application claims the benefit of U.S. provisional application Ser. No. 63/049,161, filed Jul. 8, 2020 and Taiwan application Serial No. 110114401, filed Apr. 21, 2021, the disclosure of which is incorporated by reference herein in its entirety.

TECHNICAL FIELD

The disclosure relates in general to a method and a system for simultaneously tracking 6 DoF poses of a movable object and a movable camera.

BACKGROUND

Existing tracking technologies, such as the simultaneous localization and mapping (SLAM) technology, could track the 6 DoF poses of a movable camera but could not simultaneously track a movable object. This is because the movable camera could not perform positioning without stable environmental feature points, and unstable feature points of the movable object will normally be discarded and could not be used for tracking purpose.

On the other hand, the technologies for tracking the movable object normally neglect environmental feature points to avoid interference, so that they are unable to track the camera.

Most of the features learned by the neural network are classified to tell the types of objects rather than the 6 DoF poses of objects. Some neural networks in posture or gesture recognition could be trained to output the 2D coordinates (x,y) of skeleton joints. Despite the distance between the joint and the camera could be estimated with the aid of depth sensing technology, the estimated coordinates are not real 3D coordinates in the space and the 6 DoF poses of the object in the space still could not be computed.

In the motion capture system, several fixed cameras are used to track the positions of the joints. Normally, the motion capture system will attach a mark to the joint to reduce errors. However, the motion capture system does not track the 6 DoF poses of the movable camera.

Among the existing technologies, not any technology could simultaneously track the movable object and the movable camera.

Along with the rapid advance in the mixed reality (MR) technology, the researchers are able to develop a technology for simultaneously tracking the 6 DoF poses of a movable camera and a movable object. In the MR application, since the camera configured on the MR glasses moves along with the head, the user's position and direction could not be obtained with the 6 DoF poses of the camera. Since the object which interacts with the user will move as well, the 6 DoF poses of the object also need to be obtained for the virtual contents to be displayed at suitable position and direction. Moreover, since the user wearing the MR glasses could walk freely around indoors or outdoors, it is very difficult to put marks in the environment. Except the inherent features of objects, no markers are attached in order to provide better user experiences.

Despite of the above difficulties encountered in tracking the 6 DoF poses, the present disclosure still provides a technology for simultaneously tracking the movable object and the movable camera, not only resolving the above problems, but further meeting the requirements of several applications.

SUMMARY

According to one embodiment, a method for simultaneously tracking several 6 DoF poses of a movable object and a movable camera is provided. The method the following steps: A series of images are captured by a movable camera, several environmental feature points are extracted from the images and are matched to compute several camera matrixes of the movable camera, and the 6 DoF poses of the movable camera are computed using the camera matrixes. At the same time, several feature points of the movable object are inferred from the images captured by the movable camera, the coordinates of the feature points of the movable object are corrected using the camera matrixes corresponding to the images as well as geometric constraints and temporal constraints which are predefined. Then, the 6 DoF poses of the movable object are computed using the coordinates of the corrected feature points and their corresponding camera matrixes.

According to another embodiment, a system for simultaneously tracking 6 DoF poses of a movable object and a movable camera is provided. The system includes a movable camera, a movable camera 6 DoF poses computation unit and a movable object 6 DoF computation unit. The movable camera is used to capture a series of images. The movable camera 6 DoF poses computation unit is used to extract several environmental feature points from the images, match the environmental feature points to compute several camera matrixes of the movable camera, and then compute the 6 DoF poses of the movable camera using the camera matrixes. The movable object 6 DoF computation unit is used to infer several feature points of the movable object from the images captured by the movable camera, correct the coordinates of the feature points of the movable object using the camera matrixes corresponding to the images as well as the geometric constraints and the temporal constraints, and compute the 6 DoF poses of the movable object using the coordinates of the corrected feature points and their corresponding camera matrixes.

The above and other aspects of the disclosure will become better understood with regard to the following detailed description of the preferred but non-limiting embodiment(s). The following description is made with reference to the accompanying drawings.

Figure 1A:
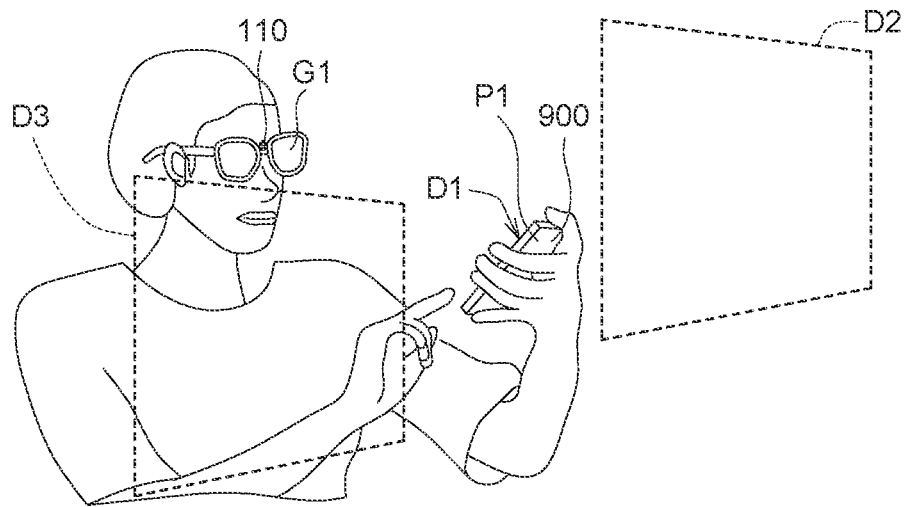
FIGS. 1A and 1B are schematic diagrams illustrating a comparison between the technology of the present disclosure for simultaneously tracking a movable object and a movable camera and the prior art in terms of application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
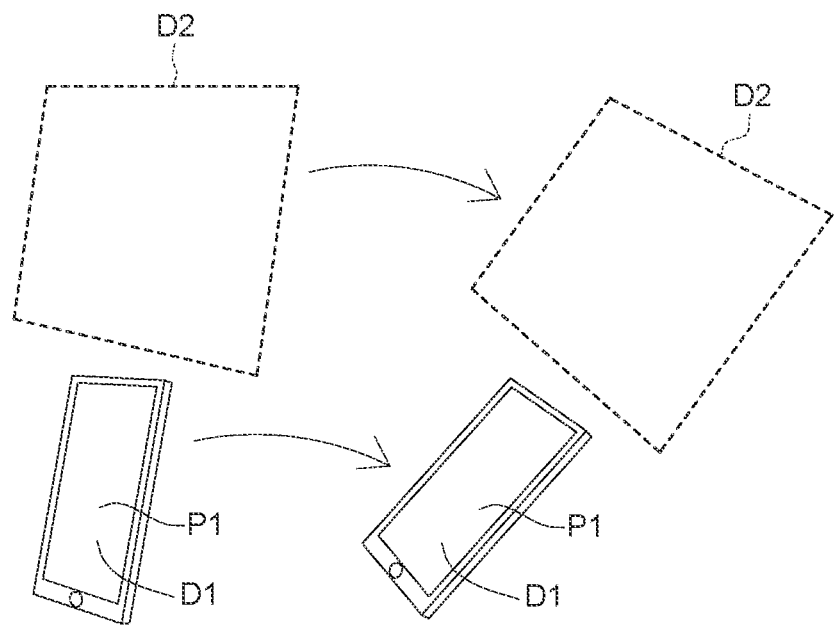

Referring to FIGS. 1A and 1B, schematic diagrams illustrating a comparison between the technology of the present disclosure for simultaneously tracking a movable object and a movable camera and the prior art in terms of application are shown. The technology of the present disclosure could be used to, as indicated in FIG. 1A, when the user wears MR glasses G1 (a movable camera 110 is configured on MR glasses G1), display one or more virtual screens besides the actual screen of a hand-held device, such as a mobile phone P1 (that is, a movable object 900), and predetermine the position, direction and size of the virtual screens D2 and D3 according to the mobile phone P1 and the 6 DoF poses of the movable camera 110 configured on and the MR glasses G1. The movable camera 110 is "movable" relative to a static object in the 3D space. Moreover, by tracking the 6 DoF poses, the rotation and movement of the virtual screens D2 and D3 could be automatically controlled to be consistent with the viewing direction (as indicated in FIG. 1B), and the user could adjust the position and angle of the virtual screens D2 and D3 according to personal preference. In the prior art, the virtual screen moves along with the MR glasses G1 instead of the 6 DoF poses of the object. The technology of the present disclosure provides the user with the following convenience: (1) the small physical screen D1 could be expanded to a larger virtual screen D2; (2) the single physical screen D1 could be augmented to multiple virtual screens D2 and D3; meanwhile, more application programs could be checked; (3) the content of the virtual screens D2 and D3 will not be snooped by others. The above technology could also be used in PC tablets or notebook computers, for example, one or more virtual screens could be displayed beside the physical screen of a PC tablet or a notebook computer. The movable object 900 could further be realized by other objects (such as vehicles, bicycles, or passengers) whose features could be defined in addition to the physical screen. The movable camera 110 is not limited to the camera configured on the MR glasses G1. For example, the movable camera 110 could be realized by the camera configured on a robot or a vehicle that could move by itself.

Figure 2A:
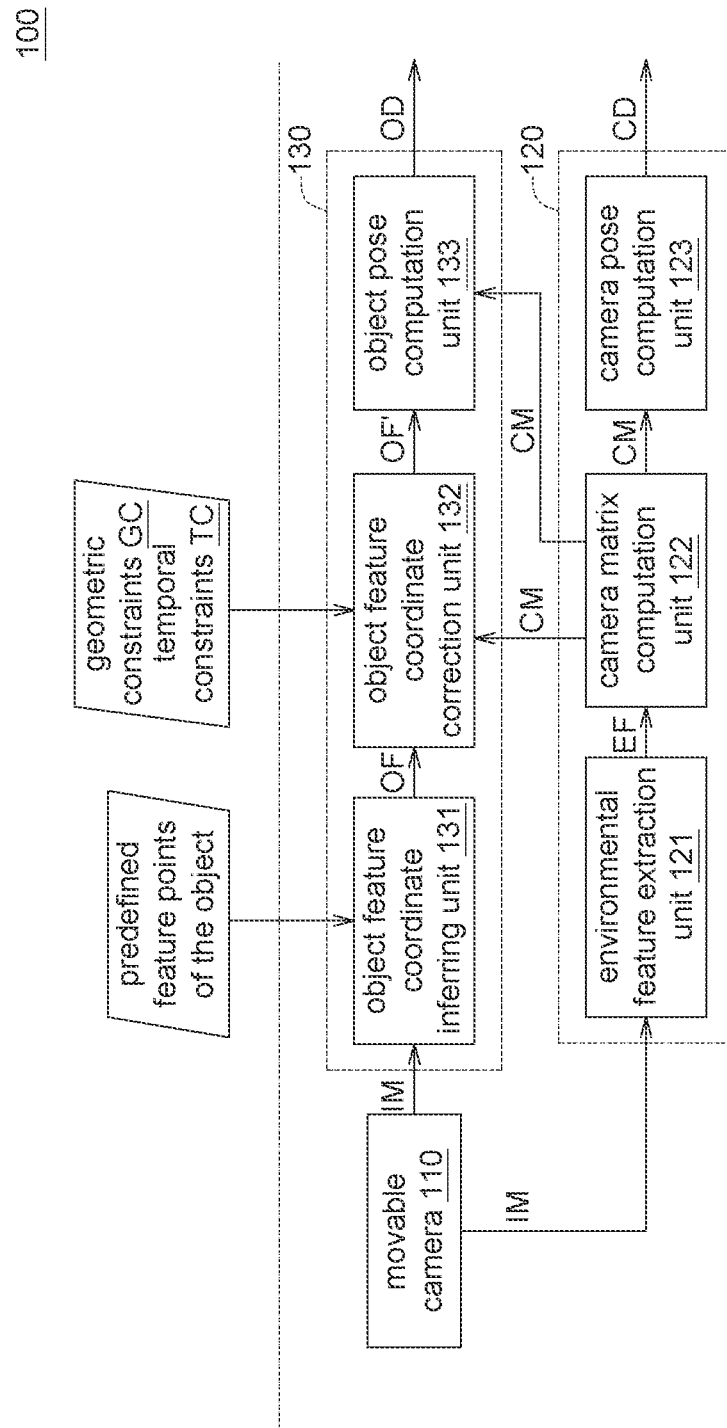
FIG. 2A is a schematic diagram of a system and a method for simultaneously tracking 6 DoF poses of a movable object and a movable camera according to an embodiment.

Referring to FIG. 2A, a schematic diagram of a system 100 and a method for simultaneously tracking 6 DoF poses of a movable object 900 (marked in FIG. 1A) and a movable camera 110 according to an embodiment is shown. The movable object 900 could be realized by such as the mobile phone P1 of FIG. 1A; the movable camera 110 could be realized by such as the camera configured on the MR glasses G1 of FIG. 1A. The system 100 for simultaneously tracking 6 DoF poses of the movable object 900 and a movable camera 110 includes a movable camera 110, a movable camera 6 DoF poses computation unit 120 and a movable object 6 DoF poses computation unit 130. The movable camera 110 is used to capture a series of images IM. The movable camera 110 could be configured on a head-mount 3D display, a mobile device, a computer or a robot. The movable camera 6 DoF poses computation unit 120 and/or the movable object 6 DoF poses computation unit 130 such as a circuit, chip, a circuit board, a programming code, or a storage device for storing code.

The movable camera 6 DoF poses computation unit 120 includes an environmental feature extraction unit 121, a camera matrix computation unit 122 and a camera pose computation unit 123, and could be realized by such as a circuit, chip, a circuit board, a programming code, or a storage device for storing code. The environmental feature extraction unit 121 is used to extract several environmental feature points EF from images IM. The camera matrix computation unit 122 matches the environmental feature points EF to compute several camera matrixes CM of the movable camera 110. Then, the camera pose computation unit 123 computes the 6 DoF poses CD of the movable camera 110 using the camera matrixes CM.

The movable object 6 DoF poses computation unit 130 includes an object feature coordinate inferring unit 131, an object feature coordinate correction unit 132 and an object pose computation unit 133, and could be realized by such as a circuit, chip, a circuit board, a programming code, or a storage device for storing code. The object feature coordinate inferring unit 131 is used to infer several feature points OF of the movable object 900 from the images IM captured by the movable camera 110. The feature points OF are predefined and are further compared with the images IM captured by the movable camera 110 to infer the coordinates of the feature points OF. The movable object 900 is a hard object.

Figure 2B:
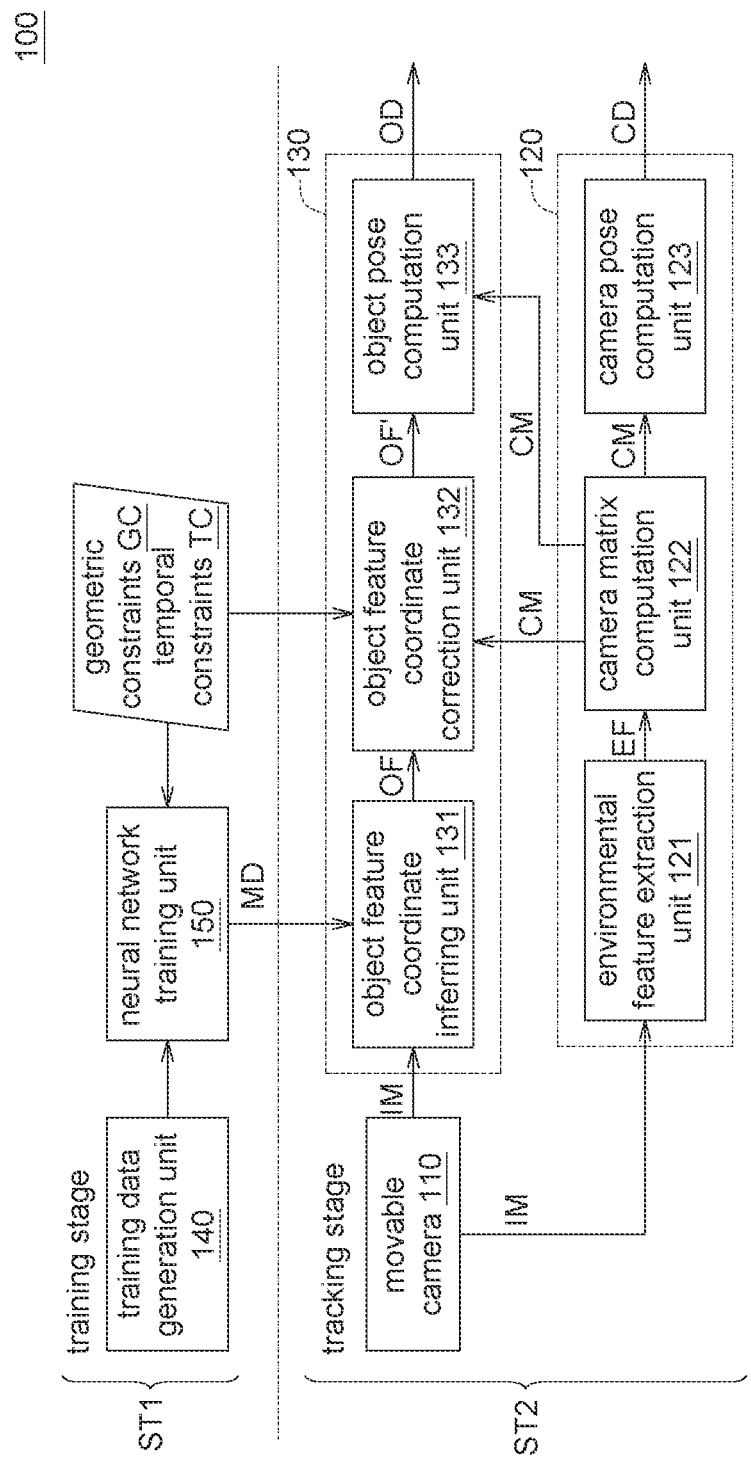
FIG. 2B is a schematic diagram of a system and a method for simultaneously tracking 6 DoF poses of a movable object and a movable camera with the introduction of a training stage.

Referring to FIG. 2B, a schematic diagram of a system 100 and a method for simultaneously tracking 6 DoF poses of a movable object 900 and a movable camera 110 according to another embodiment is shown. The method of FIG. 2B includes a training stage ST1 and a tracking stage ST2. The object feature coordinate inferring unit 131 infers the coordinates of the feature points OF of the movable object 900 from the images IM captured by the movable camera 110 using a neural network inference model MD. The neural network inference model MD is pretrained, the training data is obtained through manual or automatic marking, and the geometric constraints GC and the temporal constraints TC are added to the neural network inference model MD during the training process.

The object feature coordinate correction unit 132 corrects the coordinates of the feature points OF of the movable object 900 using the camera matrixes CM corresponding to the images IM as well as the predefined geometric constraints GC and temporal constraints TC. The object feature coordinate correction unit 132 projects the 2D coordinates of the feature points OF onto corresponding 3D coordinates using the camera matrixes CM, deletes the feature points OF whose 3D coordinate bias is greater than predetermined value according to the geometric constraints GC, or supplements the coordinates of undetected feature point OF using the coordinates of adjacent feature point OF according to the geometric constraints GC. Moreover, the object feature coordinate correction unit 132 further compares the change in the coordinates of the feature points OF in several continuous images IM according to the temporal constraints TC, and then corrects the coordinates of the feature points OF whose coordinate change is greater than a predetermined value according to the coordinates of the feature points OF corresponding to the continuous images IM to obtain the coordinates of the corrected feature points OF'.

Figure 3A:
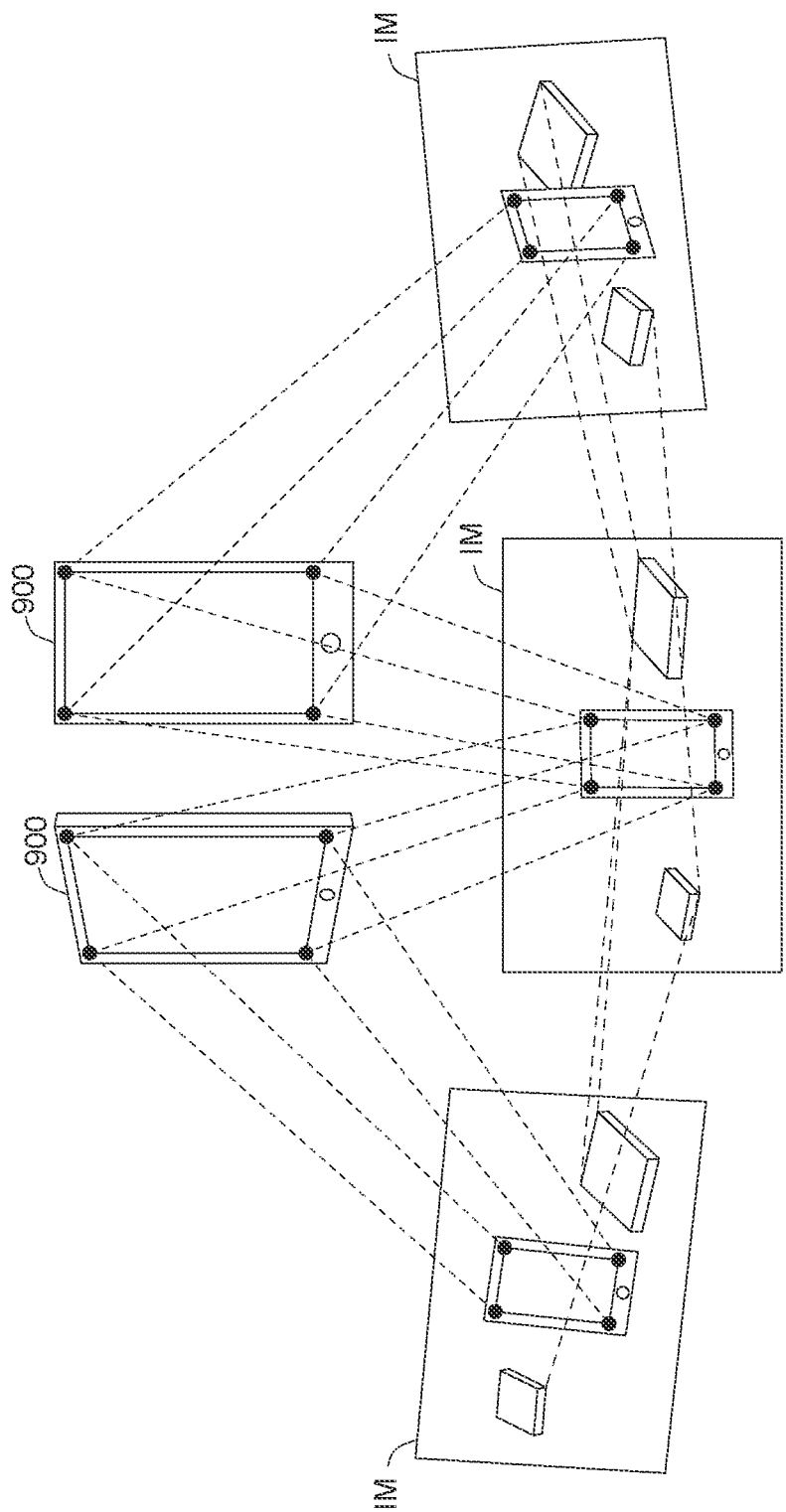
FIG. 3A is a schematic diagram illustrating corresponding relations among a series of images captured by a movable camera, environmental feature points, and the feature points of the movable object.
Figure 3B:
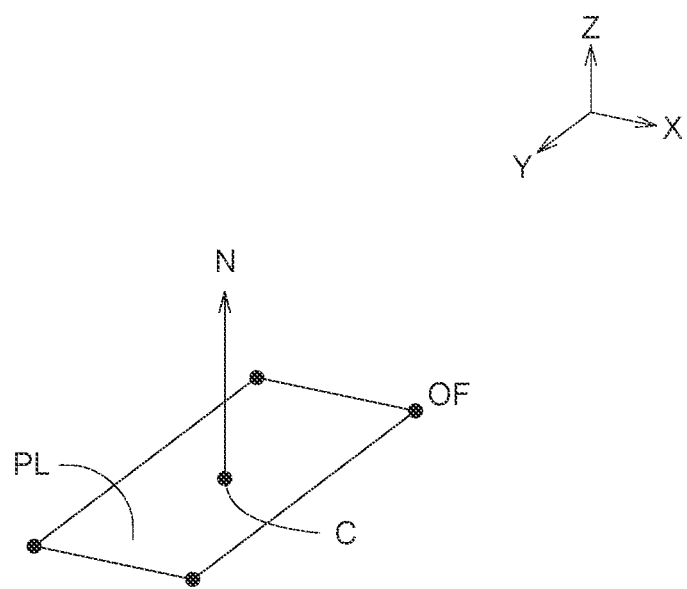
FIG. 3B a schematic diagram illustrating the position and direction of an object in the space.

Referring to FIG. 3A, a schematic diagram illustrating corresponding relations among a series of images captured by a movable camera, environmental feature points, and the feature points of the movable object is shown. For a non-planar object, the direction and the position could be defined using the centroid of several selected feature points OF. Referring to FIG. 3B, a schematic diagram illustrating the position and direction of an object in the space is shown. The feature points OF could be fitted to a best plane PL. The center point C of the best plane PL represents the position (x,y,x) of the object in the 3D space, and the normal vector N of the best plane PL represents the direction of the object.

The geometric constraints GC are defined in the 3D space. For a hard object, the distance between the feature points OF should be fixed. After the feature points are projected onto a 2D image plane using camera matrixes, the positions of all feature points OF must be within a reasonable range.

Figure 4A:
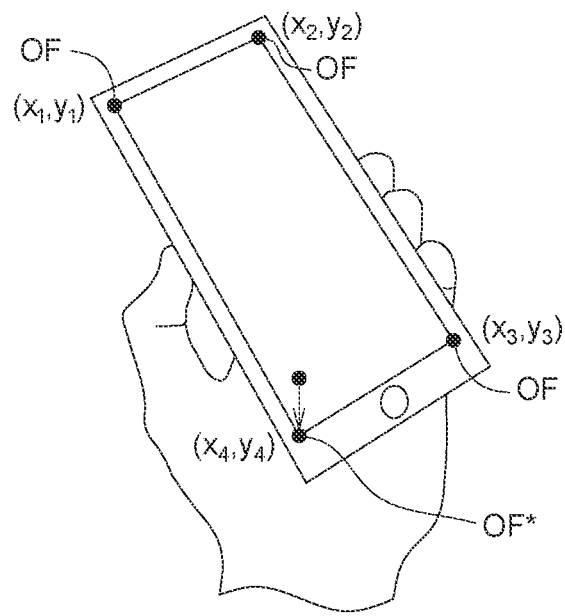
FIGS. 4A to 4B are schematic diagrams illustrating the correction of the feature points of the movable object.
Figure 4B:
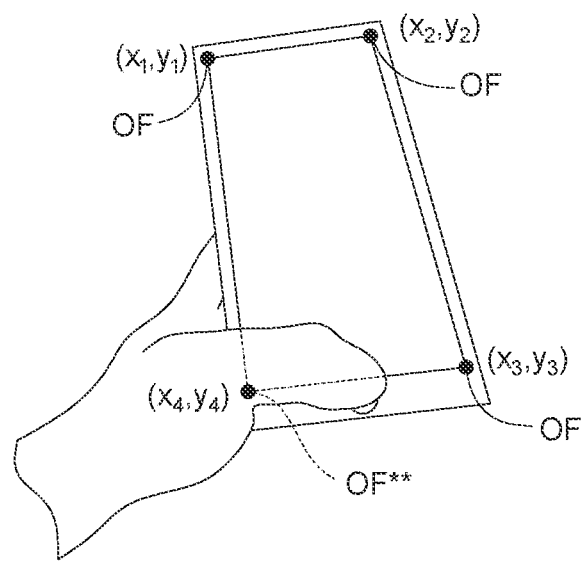

Referring to FIGS. 4A to 4B, schematic diagrams illustrating the correction of the feature points OF of the movable object are shown. The camera matrixes CM could be used to compute the 6 DoF poses of the movable camera 110 and the movable object 900. Furthermore, through the 3D geometric constraints GC, the camera matrixes CM could further be used to correct the coordinates of the feature points OF*projected on a 2D image plane (as indicated in FIG. 4A) or supplement the coordinates of a missing feature point OF(as indicated in FIG. 4B**).

The object pose computation unit 133 could compute the 6 DoF poses OD of the movable object 900 using the coordinates of corrected feature points OF' and their corresponding camera matrixes CM. For a planar movable object, the feature points OF could be used to compute a best fitted plane. The 6 DoF poses OD of the movable object 900 are defined using the center point and normal vector of the plane. For a non-planar movable object, the 6 DoF poses OD of the movable object 900 are defined using the centroid of the 3D coordinates of the feature points OF'.

As indicated in FIG. 2B, the training stage ST1 of the system 100 for simultaneously tracking 6 DoF poses of a movable object 900 and a movable camera 110 includes a training data generation unit 140 and a neural network training unit 150, and could be realized by such as a circuit, chip, a circuit board, a programming code, or a storage device for storing code.

Figure 5A:
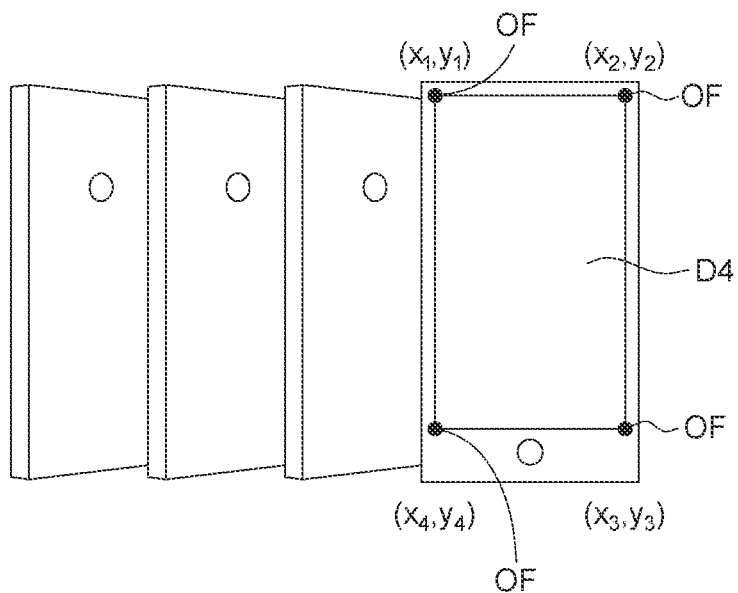
FIGS. 5A to 5D are schematic diagrams illustrating the definition of feature points of various training data exemplified by a mobile phone.
Figure 5B:
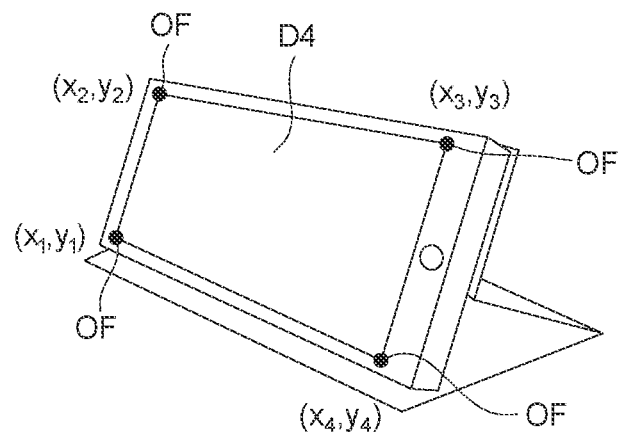
Figure 5C:
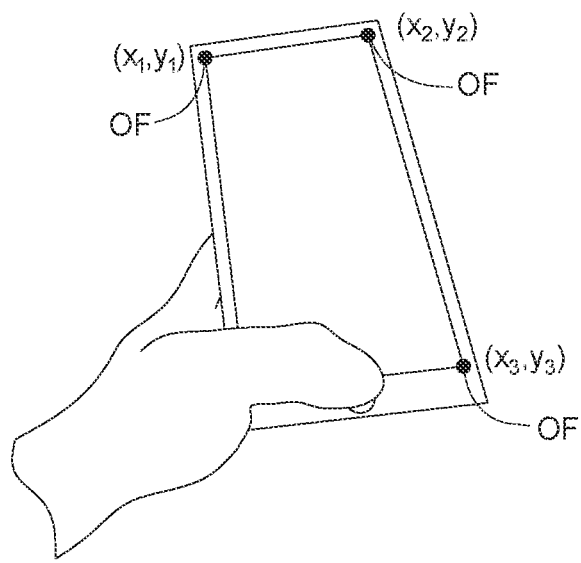
Figure 5D:
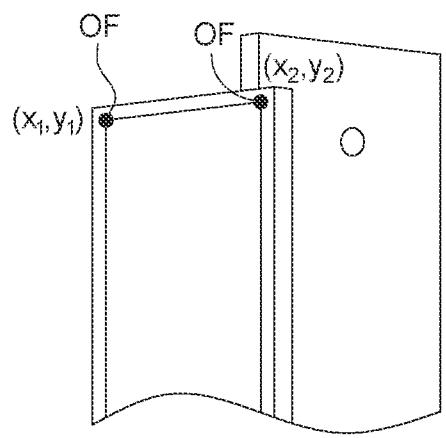

The neural network training unit 150 is used to train the neural network inference model MD. The neural network inference model MD is used to infer the positions and orders of the feature points OF of the movable object 900. In the training data generation unit 140, the training data could be the positions of manually marked feature points or a series of images or could be marked images which have been automatically augmented. Referring to FIG. 5A to 5D, schematic diagrams illustrating the definition of feature points of various training data exemplified by a mobile phone are shown. In the drawings, the feature points OF are defined by 4 inner angles of the physical screen D4. When the physical screen D4 is arranged in a vertical direction, the corners from the top left corner to the bottom left corner in a clockwise direction are designated to the orders of the 4 feature points OF. As indicated in FIG. 5A, the 4 feature points OF sequentially have the coordinates of $(x_1, y_1)$, $(x_2, y_2)$, $(x_3, y_3)$, and $(x_4, y_4)$. Even when the physical screen D4 is rotated to landscape orientation, the orders of the feature points OF remain unchanged (as indicated in FIG. 5B). In some instances, not all feature points OF could be captured. Therefore, the training data need to include some images with a missing feature point OF like FIG. 5C or FIG. 5D. As indicated in FIG. 5A and FIG. 5D, during the marking process of feature points, the front side (the screen) and the rear side of the mobile phone could be differentiated, and marking is performed only on the front side. To obtain a higher precision, during the marking process of the feature points OF, each image is enlarged until each pixel could be clearly viewed. Since manual marking is very time-consuming, automatic augmentation is required to expand the training data to million scales. The method for automatically augmenting manually marked images includes the following steps: Each image is scaled up and down, rotated, mapped using perspective projection, and then converted to different colors; the brightness and contrast are adjusted, moving blur and noises are added; particular feature points (as indicated in FIG. 5C and FIG. 5D) are blocked by other object, the content displayed on the screen are changed, or the background is replaced. Then, the positions of manually marked feature points OF in automatically augmented images are computed according to the conversion relation.

Figure 6:
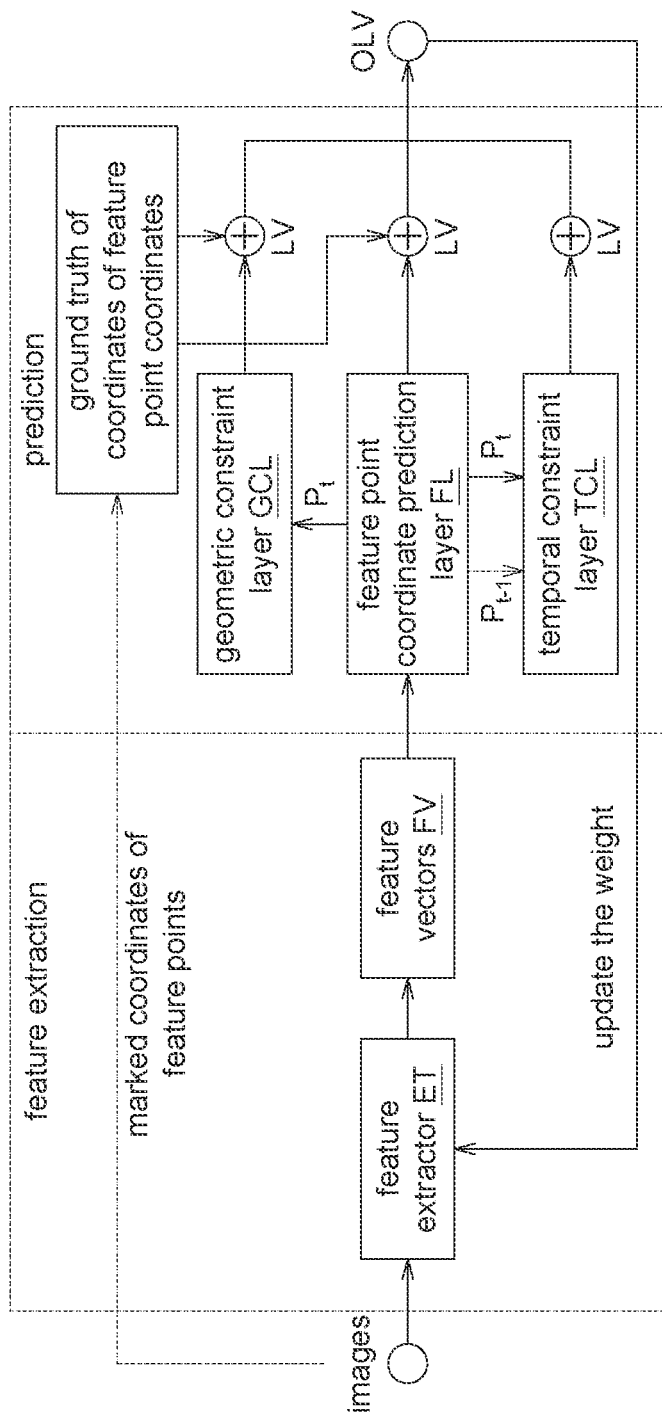
FIG. 6 is a structural diagram of a neural network in a training stage.

Referring to FIG. 6, a structural diagram of a neural network in a training stage is shown. The main structure of the neural network in the training stage includes feature extraction and feature point coordinate prediction. The feature extractor ET could adopt a deep residual network, such as ResNet, or other networks with similar functions. The extracted feature vectors FV could be transmitted to the feature point coordinate prediction layer FL to infer the coordinates of the feature points OF (for example, the coordinates of the feature points OF in the current image are represented by $P_t$; the coordinates of the feature points OF in the previous image are represented by $P_{t-1}$). The present embodiment further includes a geometric constraint layer GCL and a temporal constraint layer TCL in addition to the feature point prediction layer to reduce incorrect predictions. In the training stage, the loss value LV between the predicted value and the true value is computed according to the loss function in each layer, then the loss values and their corresponding weights dare accumulated to obtain an overall loss value OLV.

Figure 7:
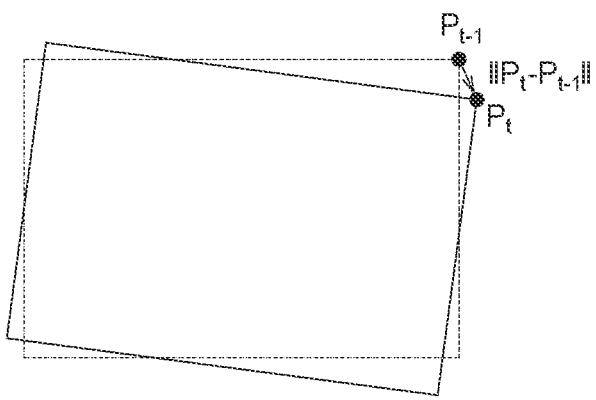
FIG. 7 is a schematic diagram illustrating the computation of feature point displacement between neighboring images.

Referring to FIG. 7, a schematic diagram illustrating the computation of feature point displacement between neighboring images is shown. The coordinates of the feature points OF in the current image are represented by $P_t$; the coordinates of the same feature points OF in the previous image are represented by $P_{t-1}$; and the displacement is defined as: $\|P_t - P_{t-1}\|$.

Unreasonable displacement is restricted using penalty $\hat{z}$. The penalty $\hat{z}$ is computed according to formula (1):

$$\hat{z} = \begin{cases} \frac{d-m}{s}, & \text{if } d > m \\ 0, & \text{otherwise} \end{cases} \quad (1)$$

Figure 8:
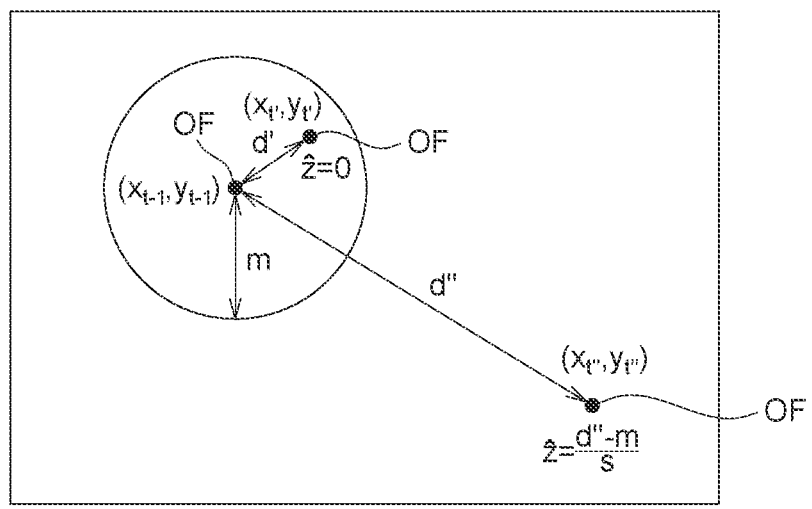
FIG. 8 is a schematic diagram illustrating the computation and determination method of temporal constraints.

Wherein, m represents the mean of displacement for each feature point OF computed from all training data; s represents the displacement standard error, d represents the displacement of the same feature point OF between the previous image and the current image. When d≤m, the displacement is within an acceptable range and there is not penalty (that is, ẑ=0). Referring to FIG. 8, a schematic diagram illustrating the temporal constraints TC and the computation and the determination method of penalty ẑ is shown. The center of the circle represents the coordinates of the feature point OF $(x_{t-1}, y_{t-1})$ in the previous image; the area of the circle represents the range of acceptable displacement of the feature point OF in the current image. In the current image, if the set of predicted coordinates $(x_t', y_t')$ of the feature point OF is within the circle (that is, displacement d'≤m), then the value of the penalty ẑ is equivalent to 0. In the current image, if the set of predicted coordinates $(x_{t''}, y_{t''})$ of the feature point OF is outside the circle (that is, displacement d''>m), then the value of the penalty ẑ is $$\hat{z} = \frac{d'' - m}{s}.$$

When the displacement is outside the radius of the circle (that is, m) to a larger extent, a larger penalty ẑ and a larger loss value will be obtained in the training process, and the coordinates of the feature points OF are therefore restricted within a reasonable range.

Figure 9:
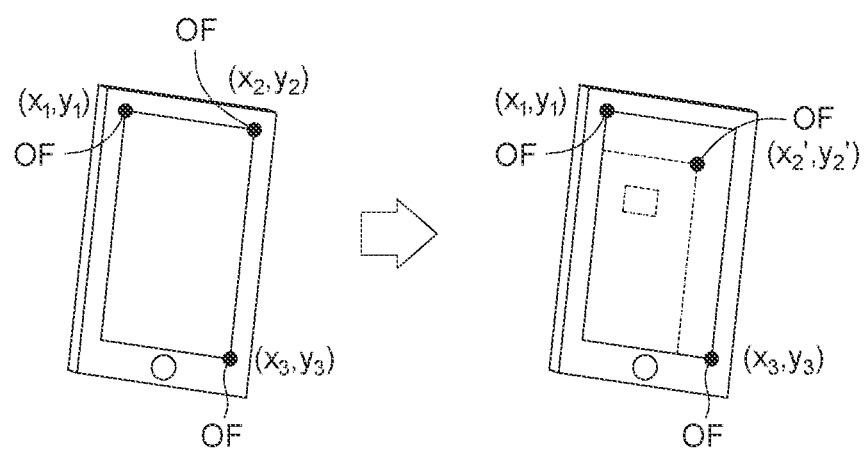
FIG. 9 is a schematic diagram illustrating an incorrect displacement generated in the absence of temporal constraints.

Referring to FIG. 9, a schematic diagram illustrating an incorrect displacement generated in the absence of temporal constraints TC is shown. The left-hand side of FIG. 9 represent the previous image, and the right-hand side represents the current image. In the previous image, the feature point OF with coordinates $(x_2, y_2)$ could be recognized. In the current image, the feature point OF with coordinates $(x'_2, y'_2)$ could be recognized from the reflected image. Since the displacement between the coordinates $(x'_2, y'_2)$ and the coordinates $(x_2, y_2)$ is greater than the range as set in the temporal constraints TC, it is determined that the coordinates $(x'_2, y'_2)$ are incorrect.

As indicated in FIG. 2B, in the tracking stage ST2, the movable camera 110 captures a series of images IM. Several environmental feature points EF are extracted from the images and are used to compute the camera matrixes CM and the 6 DoF poses CD corresponding to the movable camera 110. Meanwhile, the coordinates of the feature points OF of the movable object 900 are also inferred by the neural network inference model MD and then are converted and corrected using the camera matrixes CM to obtain the 6 DoF poses OD of the movable object 900.

Figure 10:
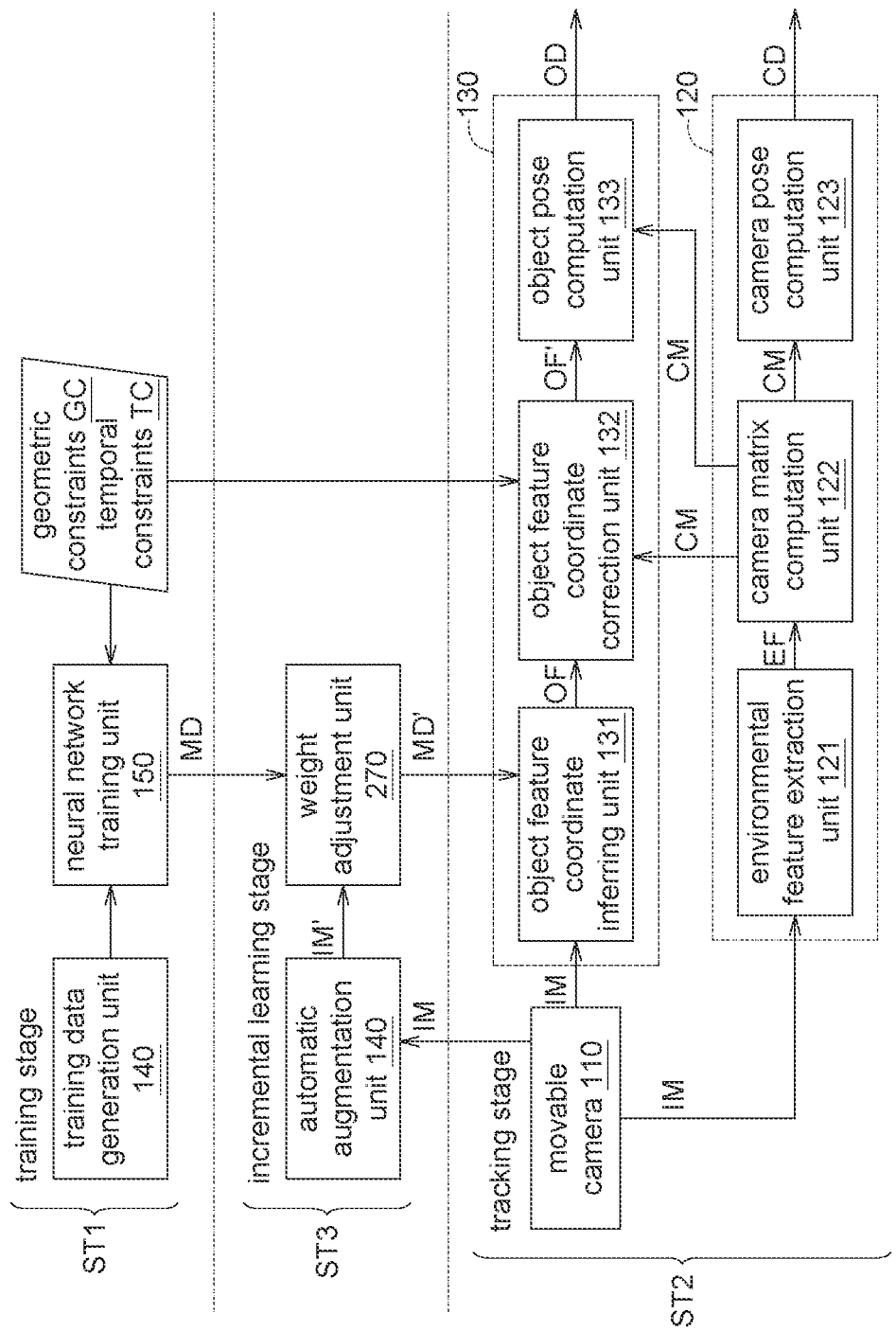
FIG. 10 is a schematic diagram of a system and a method for simultaneously tracking 6 DoF poses of a movable object and a movable camera with the introduction of incremental learning stage.

Referring to FIG. 10, a schematic diagram of a system 200 and a method for simultaneously tracking 6 DoF poses of a movable object 900 (marked in FIG. 1A) and a movable camera 110 with the introduction of incremental learning stage ST3 is shown. The system 200 includes an automatic augmentation unit 260 and a weight adjustment unit 270, and could be realized by such as a circuit, chip, a circuit board, a programming code, or a storage device for storing code.

In the neural network inference model MD as indicated in an embodiment of FIG. 10, in the training stage, the training data is formed by manual marking and automatic augmentation; in the incremental learning stage, the training data is formed by automatic marking and automatic augmentation.

When tracking the movable object 900, the neural network inference model MD performs incremental learning in the background. The training data used for incremental learning includes the images IM captured by the movable camera 110 and the images IM' automatically augmented by the automatic augmentation unit 260 according to the images IM. The automatic augmentation unit 260 further replaces manual mark with the coordinates of the corrected feature points OF corresponding to the images IM and IM' and uses the coordinates of the corrected feature point OF corresponding to the images IM and IM' as the ground truth of the feature point coordinates. The weight adjustment unit 270 adjusts the weights used in the neural network inference model MD and updates the neural network inference model MD to be the neural network inference model MD', such that the system and the method of the present disclosure could be adapted to the scenarios of use to accurately track the 6 DoF poses OD of the movable object 900.

Figure 11:
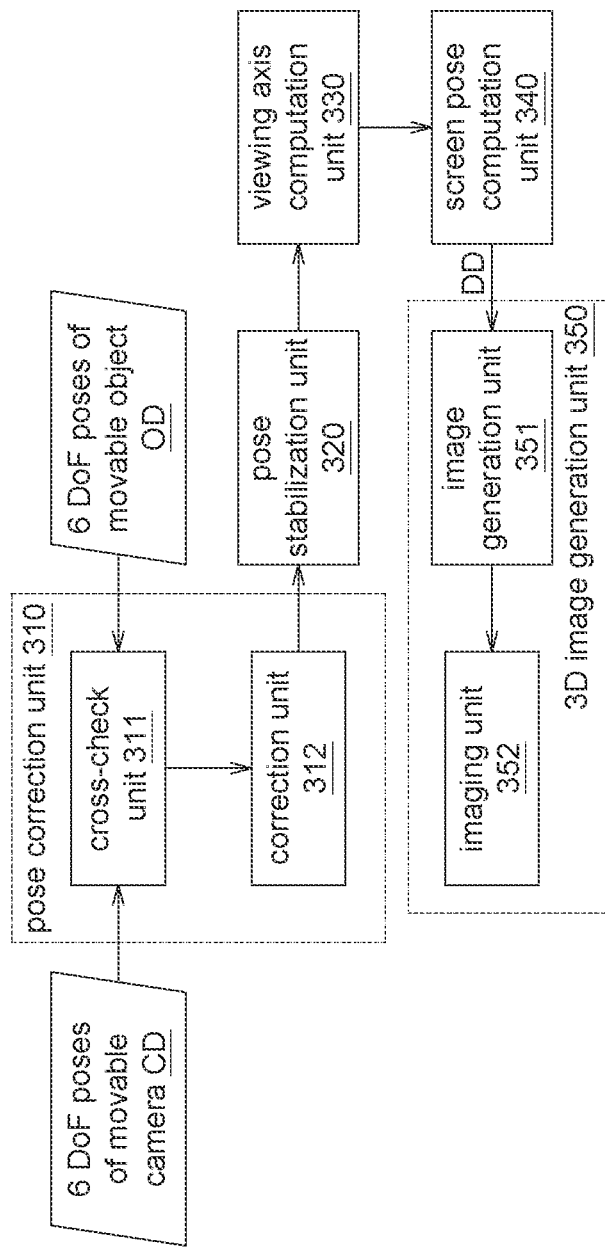
FIG. 11 is a schematic diagram of a system and a method for simultaneously tracking 6 DoF poses of a movable object and a movable camera used in MR glasses.

Referring to FIG. 11, a schematic diagram of a system 300 and a method for simultaneously tracking 6 DoF poses of a movable object 900 and a movable camera 110 used in MR glasses is shown. The system 300 includes a pose correction unit 310, a pose stabilization unit 320, a viewing axis computation unit 330, a screen pose computation unit 340 and a 3D image generation unit 350, and could be realized by such as a circuit, chip, a circuit board, a programming code, or a storage device for storing code. The pose correction unit 310 includes a cross-check unit 311 and a correction unit 312, and could be realized by such as a circuit, chip, a circuit board, a programming code, or a storage device for storing code. The 3D image generation unit 350 includes an image generation unit 351 and an imaging unit 352, and could be realized by such as a circuit, chip, a circuit board, a programming code, or a storage device for storing code.

As the movable camera 110 and the movable object 900 move, the 6 DoF poses CD of the movable camera 110 and the 6 DoF poses OD of the movable object 900 need to be cross-checked and corrected (as indicated in FIG. 8). The cross-check unit 311 of the pose correction unit 310 is used to cross-checked the 6 DoF poses OD of the movable object 900 with the 6 DoF poses CD of the movable camera 110. The correction unit 312 is used to correct the 6 DoF poses OD of the movable object 900 and the 6 DoF poses CD of the movable camera 110.

When the user's head slightly wobbles spontaneously, the 6 DoF poses of the movable camera and the movable object need to be re-computed. Under such circumstances, the virtual screen D2 (illustrated in FIG. 1A) will wobble and make the user feel dizzy. The pose stabilization unit 320 is used to determine whether the change in the 6 DoF poses OD of the movable object 900 or the 6 DoF poses CD of the movable camera 110 is less than a predetermined value. If the change is less than a predetermined value, the 6 DoF poses OD of the movable object 900 and the 6 DoF poses CD of the movable camera 110 will not be changed.

The viewing axis computation unit 330 is used to compute the viewing axes of the user's two eyes according to the 6 DoF poses CD of the movable camera 110.

The screen pose computation unit 340 is used to compute the 6 DoF poses DD of the virtual screen D2 according to the 6 DoF poses OD of the movable object 900 and the 6 DoF poses CD of the movable camera 110, such that the virtual screen D2 will move along with the movable object 900 (as indicated in FIG. 1B) or the 6 DoF poses of the movable camera 110 to change the view-angle of the virtual screen D2.

The image generation unit 351 of the 3D image generation unit 350 is used to generate the left-side and right-side views of the virtual screen D2 according to the 6 DoF poses DD of the virtual screen D2 and the optical parameters of the 3D display (such as MR glasses G1 of FIG. 1A). The imaging unit 352 of the 3D image generation unit 350 is used to display the 3D image of the virtual screen D2 on a 3D display (such as the MR glasses G1 of FIG. 1A).

The imaging unit 352 of the 3D image generation unit 350 could display the virtual screen D2 at a specific position near the movable object 900 according to the user's setting.

The technology of the present disclosure could be used to: when the user wears MR glasses, display one or more virtual screens besides the real screen of a hand-held device, such as a mobile phone, and set the predetermined position, direction and size of the virtual screen according to the 6 DoF poses of the camera configured on the mobile phone and the MR glasses. Moreover, by tracking the 6 DoF poses, the virtual screen could be automatically controlled to rotate or move to be consistent with the viewing direction. The technology of the present disclosure provides the user with the following convenience: (1) the small physical screen D1 could be expanded to a larger virtual screen D2; (2) the single physical screen D1 could be augmented to multiple virtual screens D2 and D3; meanwhile, more application programs could be checked; (3) the content of the virtual screens D2 and D3 will not be snooped by others.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A method for simultaneously tracking a plurality of 6 Degrees-of-Freedom (DoF) poses of a movable object and a movable camera, comprising:
   capturing a plurality of images by the movable camera, extracting a plurality of environmental feature points from the images, matching the environmental feature points to compute a plurality of camera matrixes of the movable camera, and calculating the 6 Degrees-of-Freedom poses of the movable camera using the camera matrixes; and
   inferring a plurality of feature points of the movable object from the images captured by the movable camera, correcting a plurality of coordinates of the feature points of the movable object using the camera matrixes corresponding to the images as well as geometric constraints and temporal constraints which are pre-defined, and calculating the 6 Degrees-of-Freedom poses of the movable object using the coordinates of the corrected feature points and their corresponding camera matrixes.

2. The method for simultaneously tracking the 6 Degrees-of-Freedom poses of the movable object and the movable camera according to claim 1, wherein the feature points of the movable object that inferred from the images captured by the movable camera are predefined and are further compared with the images captured by the movable camera to infer the coordinates of the feature points.

3. The method for simultaneously tracking the 6 Degrees-of-Freedom poses of the movable object and the movable camera according to claim 1, wherein the feature points of the movable object are inferred from the images captured by the movable camera, the coordinates of the feature points are inferred by a neural network inference model which is pre-trained, training data of the neural network inference model is formed by manual marking and automatic augmentation, and the geometric constraints and the temporal constraints are added to a training process of the neural inference network model.

4. The method for simultaneously tracking the 6 Degrees-of-Freedom poses of the movable object and the movable camera according to claim 3, wherein when tracking the movable object, the neural network inference model performs incremental learning in background, and the training data for the incremental learning comprises: the images captured by the movable camera and the images automatically augmented from the captured images, wherein the manual marking is replaced by the coordinates of the corrected feature points corresponding to the images, weights of the neural network inference model are adjusted, and the neural network inference model is updated, such that the coordinates of the feature points of the movable object is inferred.

5. The method for simultaneously tracking the 6 Degrees-of-Freedom poses of the movable object and the movable camera according to claim 1, further comprising:
   cross-comparing the 6 Degrees-of-Freedom poses of the movable object with the 6 Degrees-of-Freedom poses of the movable camera, and adjusting the 6 Degrees-of-Freedom poses of the movable object and the 6 Degrees-of-Freedom poses of the movable camera;
   not changing the 6 Degrees-of-Freedom poses of the movable object and the 6 Degrees-of-Freedom poses of the movable camera if a change in the 6 Degrees-of-Freedom poses of the movable object or the 6 Degrees-of-Freedom poses of the movable camera is less than a predetermined value;
   calculating viewing axes of a users two eyes according to the 6 Degrees-of-Freedom poses of the movable camera;
   calculating 6 Degrees-of-Freedom poses of a virtual screen according to the 6 Degrees-of-Freedom poses of the movable object and the 6 Degrees-of-Freedom poses of the movable camera; and
   generating a left-side view and a right-side view of the virtual screen according to the 6 Degrees-of-Freedom poses of the virtual screen and optical parameters of a three-dimensional display and displaying a three-dimensional image of the virtual screen on the three-dimensional display.

6. The method for simultaneously tracking the 6 Degrees-of-Freedom poses of the movable object and the movable camera according to claim 5, wherein the virtual screen set by the user is displayed at a specific position near the movable object and moves along with the movable object.

7. The method for simultaneously tracking the 6 Degrees-of-Freedom poses of the movable object and the movable camera according to claim 1, wherein the step of correcting the coordinates of the feature points of the movable object comprises:
   projecting two-dimensional coordinates of the feature points onto corresponding three-dimensional coordinates using the camera matrixes;
   deleting the feature points whose bias in the three-dimensional coordinates is greater than a predetermined value according to the geometric constraints or deleting coordinates of undetected feature point supplemented using coordinates of adjacent feature point according to the geometric constraints; and comparing a change in the coordinates of the feature points in the continuous images according to the temporal constraints, and then correcting the coordinates of the feature points whose coordinate change is greater than a predetermined value according to the coordinates of corresponding feature points in the continuous images.

8. The method for simultaneously tracking the 6 Degrees-of-Freedom poses of the movable object and the movable camera according to claim 1, wherein in the step of calculating 6 Degrees-of-Freedom poses of the movable object, for a planar movable object, a fitted plane is computed using the feature points, wherein the 6 Degrees-of-Freedom poses of the movable object are defined using a center point and a normal vector of the fitted plane;

for a non-planar movable object, the 6 Degrees-of-Freedom poses of the movable object are defined using a centroid of the three-dimensional coordinates of the feature points.

9. The method for simultaneously tracking the 6 Degrees-of-Freedom poses of the movable object and the movable camera according to claim 1, wherein the movable object is a hard object, and the movable camera is configured on a head-mount three-dimensional display, a mobile device, a computer or a robot.

10. A system for simultaneously tracking a plurality of 6 Degrees-of-Freedom poses of a movable object and a movable camera, comprising:

a movable camera used to capture a plurality of images;

a movable camera 6 Degrees-of-Freedom poses computation unit used to extract a plurality of environmental feature points from the images, match the environmental feature points to compute a plurality of camera matrixes of the movable camera, and then compute the 6 Degrees-of-Freedom poses of the movable camera using the camera matrixes; and a movable object 6 Degrees-of-Freedom poses computation unit used to infer a plurality of feature points of the movable object from the images captured by the movable camera, correct coordinates of the feature points of the movable object using the camera matrixes corresponding to the images as well as geometric constraints and temporal constraints which are predefined, and then compute the 6 Degrees-of-Freedom poses of the movable object using the coordinates of the corrected feature points and their corresponding camera matrixes.

11. The system for simultaneously tracking the 6 Degrees-of-Freedom poses of the movable object and the movable camera according to claim 10, wherein the movable camera 6 Degrees-of-Freedom poses computation unit comprises:

an environmental feature extraction unit used to extract the environmental feature points from the images;

a camera matrix computation unit used to match the environmental feature points to compute the camera matrixes of the movable camera; and a camera pose computation unit used to compute the 6 Degrees-of-Freedom poses of the movable camera using the camera matrixes.

12. The system for simultaneously tracking the 6 Degrees-of-Freedom poses of the movable object and the movable camera according to claim 10, wherein the movable object 6 Degrees-of-Freedom poses computation unit comprises:

an object feature inferring unit used to infer the feature points of the movable object from the images captured by the movable camera;

an object feature coordinate correction unit used to correct the coordinates of the feature points of the movable object using the images corresponding the camera matrixes, the geometric constraints and the temporal constraints; and an object pose computation unit used to compute the 6 Degrees-of-Freedom poses of the movable object using the coordinates of the corrected feature points and their corresponding camera matrixes.

13. The system for simultaneously tracking the 6 Degrees-of-Freedom poses of the movable object and the movable camera according to claim 12, wherein the feature points of the movable object inferred from the images captured by the movable camera by the object feature inferring unit are predefined and are further compared with the images captured by the movable camera to infer the coordinates of the feature points.

14. The system for simultaneously tracking the 6 Degrees-of-Freedom poses of the movable object and the movable camera according to claim 12, wherein the object feature inferring unit infers the feature points of the movable object from the images captured by the movable camera, the coordinates of the feature points are inferred by a neural network inference model, which is pre-trained, training data is formed by manual marking and automatic augmentation, and the geometric constraints and the temporal constraints are added to training process.

15. The system for simultaneously tracking the 6 Degrees-of-Freedom poses of a movable object and the movable camera according to claim 14, wherein when tracking the movable object, the neural network inference model performs incremental learning in background, the training data for incremental learning comprises: the images captured by the movable camera and the images automatically augmented from the images, wherein the manual marking is replaced by the coordinates of the corrected feature points corresponding to the images, weights of the neural network inference model are adjusted, and the neural network inference model is updated, such that the coordinates of the feature points of the movable object is inferred.

16. The system for simultaneously tracking the 6 Degrees-of-Freedom poses of the movable object and the movable camera according to claim 10, further comprising:

a pose correction unit used to cross-checked the 6 Degrees-of-Freedom poses of the movable object with the 6 Degrees-of-Freedom poses of the movable camera to correct the 6 Degrees-of-Freedom poses of the movable object and the 6 Degrees-of-Freedom poses of the movable camera;

a pose stabilization unit, wherein the 6 Degrees-of-Freedom poses of the movable object and the 6 Degrees-of-Freedom poses of the movable camera are not changed if a change in the 6 Degrees-of-Freedom poses of the movable object or the 6 Degrees-of-Freedom poses of the movable camera is less than a predetermined value;

a viewing axis computation unit used to compute viewing axes of a user's two eyes according to the 6 Degrees-of-Freedom poses of the movable camera;

a screen pose computation unit used to compute a plurality of 6 Degrees-of-Freedom poses of a virtual screen according to the 6 Degrees-of-Freedom poses of the movable object and the 6 Degrees-of-Freedom poses of the movable camera; and a three-dimensional image generation unit used to generate a left-side view and a right-side view of the virtual screen according to the 6 Degrees-of-Freedom poses of the virtual screen and optical parameters of a three-dimensional display, and to display the three-dimensional image of the virtual screen on the three-dimensional display.

17. The system for simultaneously tracking the 6 Degrees-of-Freedom poses of the movable object and the movable camera according to claim 16, wherein the virtual screen set by the user is displayed on a specific position near the movable object and moves along with the movable object.

18. The system for simultaneously tracking the 6 Degrees-of-Freedom poses of the movable object and the movable camera according to claim 12, wherein the object feature coordinate correction unit is configured to:
   project two-dimensional coordinates of the feature points onto corresponding three-dimensional coordinates using the camera matrixes; and
   delete the feature points whose bias in the three-dimensional coordinates is greater than a predetermined value according to the geometric constraints, or supplement the coordinates of undetected feature point using the coordinates of adjacent feature point according to the geometric constraints; and
   compare the change in the coordinates of the feature points in the continuous images according to the temporal constraints and then correct the coordinates of the feature points whose coordinate change is greater than a predetermined value according to the coordinates of corresponding feature points in the continuous images.

19. The system for simultaneously tracking the 6 Degrees-of-Freedom poses of the movable object and the movable camera according to claim 12, wherein the object pose computation unit is configured to:
   for a planar movable object, compute a fitted plane using the feature points, wherein the 6 Degrees-of-Freedom poses of the movable object are defined using a center point and a normal vector of the fitted plane;
   for a non-planar movable object, define the 6 Degrees-of-Freedom poses of the movable object using the centroid of the three-dimensional coordinates of the feature points.

20. The system for simultaneously tracking the 6 Degrees-of-Freedom poses of the movable object and the movable camera according to claim 10, wherein the movable object is a hard object, and the movable camera is configured on a head-mount three-dimensional display, a mobile device, a computer or a robot.

* * * * *